United States Patent
Xie et al.

(10) Patent No.: US 12,255,485 B2
(45) Date of Patent: Mar. 18, 2025

(54) CHARGING METHOD FOR BATTERY PACK, COMPUTER-READABLE STORAGE MEDIUM, AND POWER CONSUMING APPARATUS

(71) Applicant: CONTEMPORARY AMPEREX TECHNOLOGY (HONG KONG) LIMITED, Hong Kong (CN)

(72) Inventors: Lan Xie, Ningde (CN); Zhen Lin, Ningde (CN); Shan Huang, Ningde (CN); Wei Li, Ningde (CN); Shichao Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 84 days.

(21) Appl. No.: 18/455,076

(22) Filed: Aug. 24, 2023

(65) Prior Publication Data

US 2023/0396089 A1 Dec. 7, 2023

Related U.S. Application Data

(63) Continuation of application No. PCT/CN2021/129053, filed on Nov. 5, 2021.

(51) Int. Cl.
 *H02J 7/00* (2006.01)
(52) U.S. Cl.
 CPC ........ *H02J 7/00714* (2020.01); *H02J 7/0048* (2020.01); *H02J 7/00711* (2020.01)
(58) Field of Classification Search
 USPC ....................................................... 320/134
 See application file for complete search history.

(56) References Cited

U.S. PATENT DOCUMENTS

| 2011/0031932 A1* | 2/2011 | Platonov | ............. | H02J 7/00711 |
| | | | | 320/152 |
| 2017/0256961 A1 | 9/2017 | Zeng et al. | | |

FOREIGN PATENT DOCUMENTS

| CN | 105870526 A | 8/2016 |
| CN | 106663957 A | 5/2017 |

(Continued)

OTHER PUBLICATIONS

The World Intellectual Property Organization (WIPO) International Search Report and Written Opinion for PCT/CN2021/129053 May 25, 2022 13 pages (including English translation).

(Continued)

*Primary Examiner* — Samuel Berhanu
(74) *Attorney, Agent, or Firm* — ANOVA LAW GROUP, PLLC

(57) ABSTRACT

A charging method for a battery pack includes sending, by a battery management module of the battery pack, a charging request for a first current to a charging pile for charging, controlling, by the battery management module in response to determining that first-current charging of the battery pack meets a first predetermined condition, the battery pack to perform pulse discharge, and controlling, by the battery management module in response to determining that the pulse discharge of the battery pack meets a second predetermined condition, the battery pack to stop discharging, and sending a charging request for a second current to the charging pile for charging. The second current is less than the first current.

9 Claims, 2 Drawing Sheets

(56) References Cited

FOREIGN PATENT DOCUMENTS

| | | | |
|---|---|---|---|
| CN | 107808986 | A | 3/2018 |
| CN | 111162332 | A | 5/2020 |
| CN | 112366375 | A | 2/2021 |
| EP | 3242373 | A1 | 11/2017 |
| JP | 2003189498 | A | 7/2003 |
| JP | 2007325324 | A | 12/2007 |
| JP | 2014126411 | A | 7/2014 |
| JP | 2014194925 | A | 10/2014 |
| JP | 2017013823 | A | 1/2017 |

OTHER PUBLICATIONS

The European Patent Office (EPO) The Extended European Search Report for Application No. 21962957.3, Apr. 15, 2024 9 Pages.

The Japan Patent Office (JPO) Notification of Reasons for Refusal for Application No. 2023-545242 Jun. 4, 2024 9 Pages (with translation).

* cited by examiner

CHARGING METHOD FOR BATTERY PACK, COMPUTER-READABLE STORAGE MEDIUM, AND POWER CONSUMING APPARATUS

CROSS-REFERENCE TO RELATED APPLICATION

This application claims priority to International Application No. PCT/CN/2021/129053, filed on Nov. 5, 2021, the entire content of which is incorporated herein by reference.

TECHNICAL FIELD

The present application relates to the field of batteries, and specifically to a charging method for a battery pack, a computer-readable storage medium, and a power consuming apparatus.

BACKGROUND ART

Achieving energy conservation and emission reduction is the key to the sustainable development of the automotive industry. Electric vehicles have become an important part of the sustainable development of the automotive industry due to their advantages in energy conservation and environmental protection. For the electric vehicles, the battery technology is a key factor to their development.

During a charging process, lithium precipitation may occur in a battery pack, which will affect the safety performance of the battery.

SUMMARY

In view of the above problems, the present application provides a charging method for a battery pack, a computer-readable storage medium, and a power consuming apparatus, which can reduce battery safety performance problems caused by lithium precipitation.

In a first aspect, the present application provides a charging method for a battery pack, where the battery pack includes a battery management module, and the charging method includes: sending, by the battery management module, a charging request for a first current to a charging pile for charging; controlling, when the battery management module determines that first-current charging of the battery pack meets a first predetermined condition, the battery pack to perform pulse discharge; and controlling, when the battery management module determines that pulse discharge of the battery pack meets a second predetermined condition, the battery pack to stop discharging, and sending a charging request for a second current to the charging pile for charging, where the second current is less than the first current.

In the technical solution of this embodiment of the present application, the applicant found that a moment of switching a charging current during a charging process (a moment of switching from the first current to the second current) is the moment when a risk of lithium precipitation is the highest. Further, the applicant found through research that, performing pulse discharge at the moment when the risk of lithium precipitation is the highest can effectively promote the tip of precipitated lithium metal to re-enter an electrolyte, flatten lithium dendrites, and inhibit the continuous accumulation of lithium dendrites, and improve the charging safety of the battery pack.

In some embodiments, the charging method further includes: determining, by the battery management module, a ratio of an amount of precipitated lithium of the battery pack to a threshold of precipitated lithium, and determining, by the battery management module, magnitude of the first current based on the ratio, where the threshold of precipitated lithium is an amount of precipitated lithium that triggers an internal short circuit in the battery pack. In the charging method of this embodiment of the present application, charging with different magnitudes of the first current can be implemented according to different specific lithium precipitation situations, which significantly reduces the precipitated lithium ions.

In some embodiments, the controlling, when the battery management module determines that first-current charging of the battery pack meets a first predetermined condition, the battery pack to perform pulse discharge includes: when the battery management module determines that the battery pack is continuously charged with the first current for a predetermined duration, controlling the battery pack to perform pulse discharge.

In some embodiments, the controlling, when the battery management module determines that first-current charging of the battery pack meets a first predetermined condition, the battery pack to perform pulse discharge includes: controlling, when the battery management module determines that a state of charge (SOC) of the battery pack reaches a predetermined value, the battery pack to perform pulse discharge.

In the charging method of this embodiment of the present application, a moment when pulse discharge is required can be accurately determined for different stepwise charging methods, which can accurately and effectively promote the tip of precipitated lithium metal to re-enter an electrolyte, flatten lithium dendrites, and inhibit the continuous accumulation of lithium dendrites.

In some embodiments, the controlling, when the battery management module determines that first-current charging of the battery pack meets a first predetermined condition, the battery pack to perform pulse discharge includes: when the battery management module determines that the first-current charging of the battery pack meets the first predetermined condition, sending a charging request for a current of 0 A to the charging pile, and obtaining a real-time charging current, where the real-time charging current is a current used by the charging pile to charge the battery pack; and when the battery management module determines that the real-time charging current is less than a threshold of the first current, controlling the battery pack to discharge with a discharging current, and obtaining, by the battery management module, a discharging duration for which the battery pack discharges with the discharging current.

In some embodiments, the controlling, when the battery management module determines that first-current charging of the battery pack meets a first predetermined condition, the battery pack to perform pulse discharge includes: when the battery management module determines that the first-current charging of the battery pack meets the first predetermined condition, sending a charging request for a current of 0 A to the charging pile, obtaining a real-time charging current, and obtaining a request duration of the charging request for the current of 0 A, where the real-time charging current is a current used by the charging pile to charge the battery pack; and when the battery management module determines that the real-time charging current is less than a threshold of the first current, controlling the battery pack to discharge with a discharging current, and obtaining, by the battery management module, a discharging duration for which the battery pack discharges with the discharging current.

In some embodiments, the controlling, when the battery management module determines that pulse discharge of the battery pack meets a second predetermined condition, the battery pack to stop discharging includes: when the battery management module determines that the discharging duration reaches a first duration threshold, or when the battery management module determines that the request duration reaches a second duration threshold, controlling the battery pack to stop discharging.

In some embodiments, the controlling, when the battery management module determines that first-current charging of the battery pack meets a first predetermined condition, the battery pack to perform pulse discharge includes: when the battery management module determines that the first-current charging of the battery pack meets the first predetermined condition, controlling the battery pack to perform pulse discharge to the charging pile or a power consuming apparatus, where the battery pack is located in the power consuming apparatus.

In a second aspect, there is provided a computer-readable storage medium storing computer instructions, where when the computer instructions are executed, the charging method according to the above embodiments is performed.

In a third aspect, there is provided a power consuming apparatus, where the power consuming apparatus includes a battery pack, and the battery pack is configured to perform the charging method according to the above embodiments.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

Various other advantages and benefits will become apparent to those of ordinary skill in the art upon reading the following detailed description of some implementations. Accompanying drawings are merely for the purpose of illustrating some implementations and are not to be construed as limiting the present application. Moreover, like components are denoted by like reference numerals throughout the accompanying drawings. In the drawings.

DETAILED DESCRIPTION OF EMBODIMENTS

Figure 1:
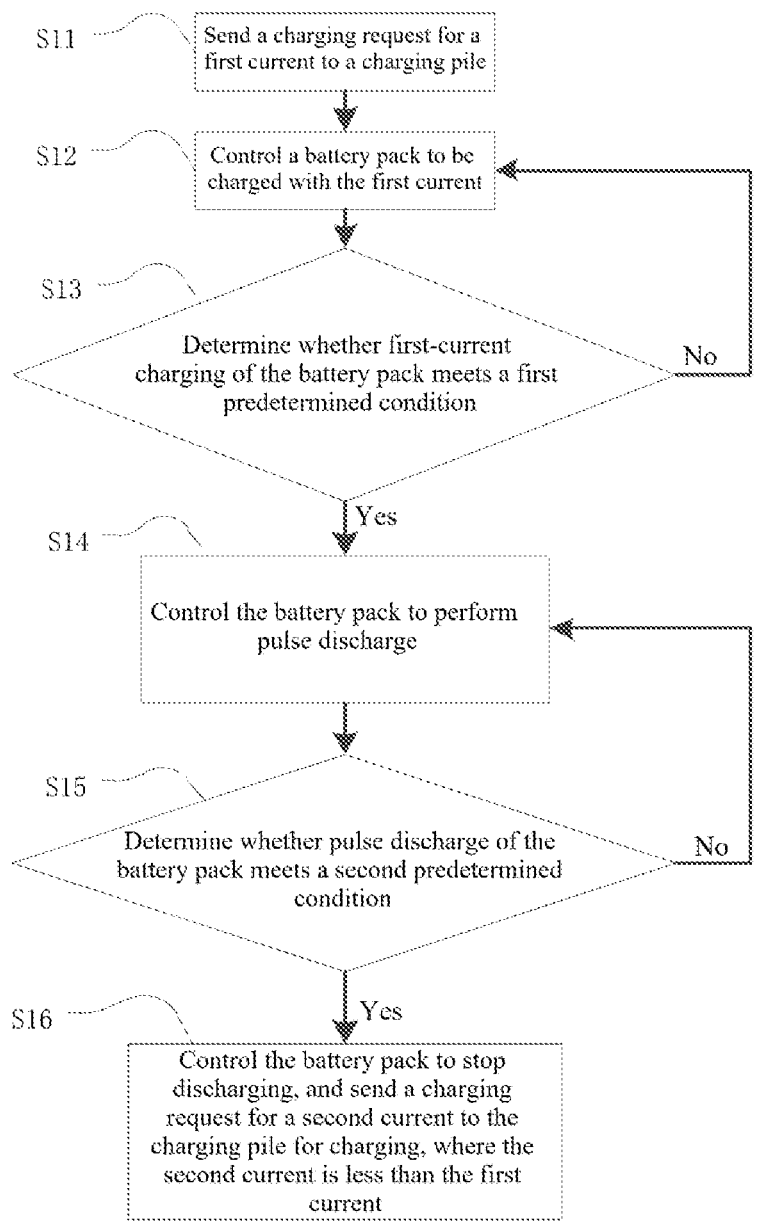
FIG. 1 is a flowchart of a charging method for a battery pack according to some embodiments of the present application.

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

If steps are stated in sequence in the description, this does not necessarily mean an embodiment or aspect is limited to the stated sequence. Conversely, it may be envisaged that the steps are performed in a different sequence or in parallel to each other, unless a next step is established on a current step, which necessarily requires the current step to be performed and then the next step (this will be clear in specific embodiments). The stated sequence may be an example.

At present, from the perspective of the development of the market situation, traction batteries are used more and more widely. The traction batteries are not only used in energy storage power systems such as hydroelectric power plants, thermal power plants, wind power plants and solar power plants, but also widely used in electric transportation means such as electric bicycles, electric motorcycles, and electric vehicles and in many fields such as military equipment and aerospace. With the continuous expansion of the application field of traction batteries, the market demand for the traction batteries is also expanding.

The inventors have noticed that during a charging process, especially during a stepwise charging process, a moment of switching a current is a moment when a risk of lithium precipitation is the highest. During normal charging of a lithium-ion battery, lithium ions are deintercalated from a positive electrode and then intercalated into a negative electrode. However, when some abnormalities occur, lithium ions cannot be intercalated into the negative electrode, but can only be precipitated on a surface of the negative electrode, forming a layer of gray material. This phenomenon is called lithium precipitation. Lithium precipitation is a degradation phenomenon in lithium-ion batteries. Lithium precipitation may not only reduce the performance and the cycle life of the battery, but also limit the fast charging capacity of the battery, and may cause disastrous consequences such as combustion and explosion.

To reduce the risk of lithium precipitation in batteries, the applicant has found through research that taking some measures at the moment when the risk of lithium precipitation is the highest can effectively reduce or even inhibit the risk of lithium precipitation.

Based on the above considerations, to solve the problem of lithium precipitation during the charging process, especially during the stepwise charging process, the inventors have designed, through in-depth research, a charging method for a battery pack, where the battery pack includes a battery management module, and the charging method includes: sending, by the battery management module, a charging request for a first current to a charging pile for charging; controlling, when the battery management module determines that first-current charging of the battery pack meets a first predetermined condition, the battery pack to perform pulse discharge; and controlling, when the battery management module determines that pulse discharge of the battery pack meets a second predetermined condition, the battery pack to stop discharging, and sending a charging request for a second current to the charging pile for charging, where the second current is less than the first current.

In this charging method, pulse discharge is performed at a moment of switching a current during the charging process, which may effectively promote the tip of precipitated lithium metal to re-enter an electrolyte, flatten lithium dendrites, and inhibit the continuous accumulation of lithium dendrites, and improve the charging safety of the battery pack.

At the moment when the current is switched during the charging process, lithium ions deintercalated from a positive electrode cannot be intercalated into a negative electrode, but can only be precipitated on a surface of the negative electrode. At this moment, a negative pulse is added, which may cause the tip of lithium metal deintercalated from the positive electrode to re-enter the electrolyte, flatten lithium dendrites, and inhibit the continuous accumulation of lithium dendrites, and improve the charging safety of the battery pack.

The battery pack involved in this embodiment of the present application may be used in, but not limited to, power consuming apparatuses such as vehicles, ships, or aircrafts. The battery pack involved in the present application may be used to form a power supply system of the power consuming apparatus, which is conducive to reducing lithium precipitation and improving the charging safety of the battery pack.

An embodiment of the present application provides a power consuming apparatus using a battery pack as a power supply. The power consuming apparatus may be, but not limited to, a mobile phone, a tablet, a notebook computer, an electric toy, an electric tool, an electromobile, an electric vehicle, a ship, a spacecraft, or the like. The electric toy may include a stationary or mobile electric toy, such as a game console, an electric vehicle toy, an electric ship toy, and an electric airplane toy. The spacecraft may include an airplane, a rocket, a space shuttle, a spaceship, etc.

FIG. 1 shows a charging method for a battery pack according to some embodiments of the present application. The battery pack includes a battery management module, and the charging method is performed by the battery management module. The battery pack includes a plurality of batteries. The battery management module is the intelligent center of the battery pack. Its core functions are to protect the battery pack, collect battery pack data, evaluate a status of the battery pack, perform charging and discharging management, and perform high-voltage control, etc.

The charging method for a battery pack in FIG. 1 starts with step S11. In step S11, a battery management module sends a charging request for a first current to a charging pile. In step S12, the battery management module controls the battery pack to be charged with the first current. In step S13, the battery management module determines whether first-current charging of the battery pack meets a first predetermined condition. If the battery management module determines that the first-current charging of the battery pack does not meet the first predetermined condition, step S12 is performed to continue to control the battery pack to be charged with the first current. If the battery management module determines that the first-current charging of the battery pack meets the first predetermined condition, step S14 is performed to control the battery pack to perform pulse discharge. In step S15, the battery management module determines whether pulse discharge of the battery pack meets a second predetermined condition. If the battery management module determines that the pulse discharge of the battery pack does not meet the second predetermined condition, step S14 is performed to continue to control the battery pack to perform pulse discharge. If the battery management module determines that the pulse discharge of the battery pack meets the second predetermined condition, the battery pack is controlled to stop discharging, and a charging request for a second current is sent to the charging pile for charging, where the second current is less than the first current.

The charging method of the present application is mainly applicable to the stepwise charging method. The stepwise charging method is a commonly used charging method in the field, and is a charging method for fast charging of a battery pack. In the stepwise charging method, the battery pack is charged with a current in a first stage and another current in a second stage, and the current in the second stage is less than that in the first stage.

Although the stepwise charging method can perform fast charging, it brings a series of safety problems. Lithium precipitation is one of these safety problems. Lithium precipitation is a degradation phenomenon in lithium-ion batteries. During normal charging of a lithium-ion battery, lithium ions are deintercalated from a positive electrode and then intercalated into a negative electrode. However, when an abnormality occurs during charging of lithium-ion batteries, lithium ions deintercalated from the positive electrode cannot be intercalated into the negative electrode, but can only be precipitated on a surface of the negative electrode, forming a layer of gray material. This phenomenon is called lithium precipitation. The lithium ions precipitated on the surface of the negative electrode will grow into lithium dendrites, and the further growth of lithium dendrites will pierce a separator between the positive and negative electrodes, causing a short circuit of the battery and causing a safety accident.

Lithium precipitation may not only reduce the performance and the life span of the battery pack, but also limit the fast charging capacity of the battery pack, and may cause safety accidents such as combustion and explosion of the battery pack.

In the present application, the applicant found through research that a moment of switching the battery pack from being charged with the first current to being charged with the second current is the moment when a risk of lithium precipitation is the highest. At the moment of switching the current, pulse discharge is performed in a timely manner (in other words, a negative pulse is added), which can effectively promote the tip of precipitated lithium metal to re-enter an electrolyte, flatten lithium dendrites, and inhibit the continuous accumulation of lithium dendrites, and significantly improve the charging safety of the battery.

Figure 2:
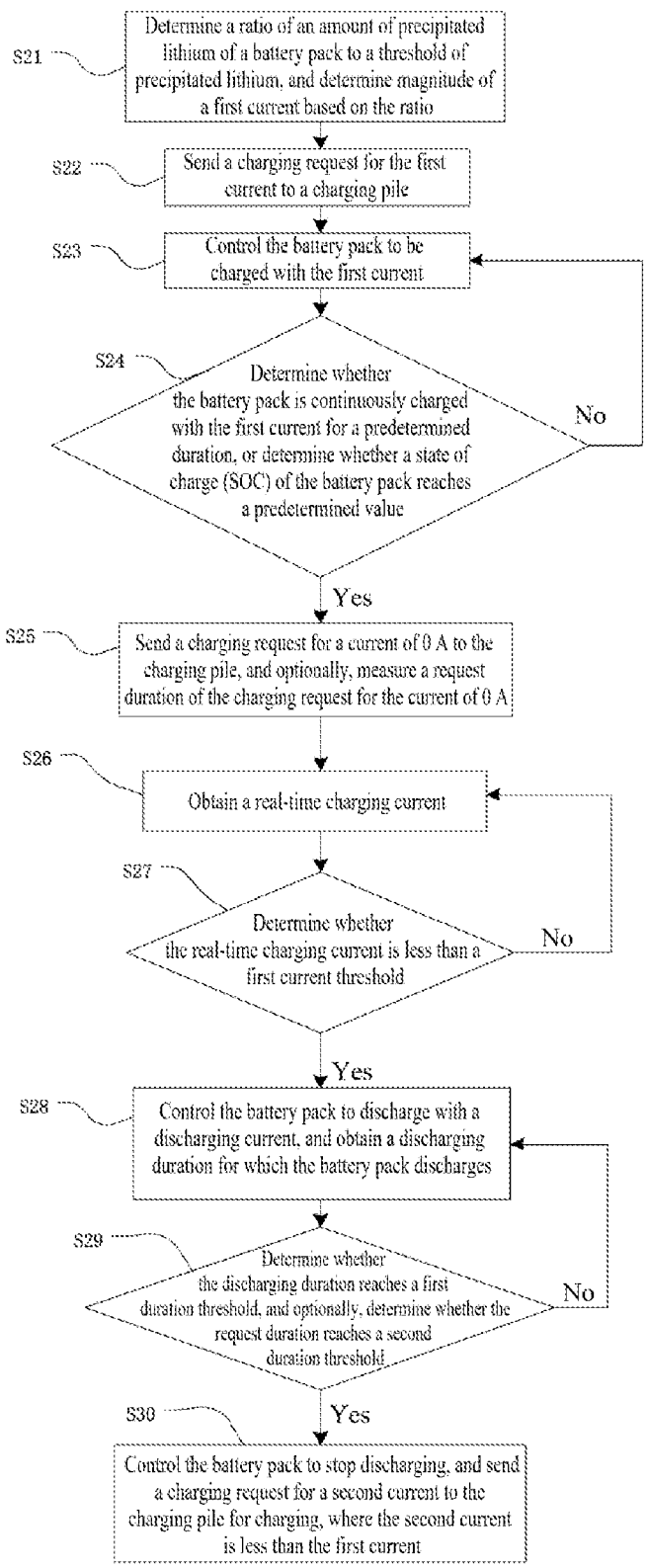
FIG. 2 is a flowchart of a charging method for a battery pack according to some other embodiments of the present application.

FIG. 2 shows a charging method for a battery pack according to some other embodiments of the present application. Similar to the description given with reference to FIG. 1, the battery pack includes a battery management module, and the charging method is performed by the battery management module.

The charging method for a battery pack in FIG. 2 starts with step S21. In step S21, the battery management module first determines a ratio of an amount of precipitated lithium of the battery pack to a threshold of precipitated lithium, and determines magnitude of the first current based on the ratio.

The battery management module obtains the amount of precipitated lithium of the battery pack using a precipitated lithium quantization model. The precipitated lithium quantization model reflects a function relationship between the amount of precipitated lithium of the battery pack and an operating time (unit: day or year) of the battery pack. Before each battery pack leaves the factory, a precipitated lithium quantization model of the battery pack is calibrated by using a high-precision device.

The battery management module obtains a threshold of precipitated lithium by querying. As described above regarding the phenomenon of lithium precipitation, continuous lithium precipitation will cause a short circuit of the battery pack, and the threshold of precipitated lithium is an amount of precipitated lithium that triggers an internal short circuit in the battery pack. The threshold of precipitated lithium is a fixed value obtained based on design information and experimental verification of the battery pack in the research and development stage. The battery management module can obtain the threshold of precipitated lithium by querying.

However, it should be understood that the present application includes but is not limited to the method of obtaining the amount of precipitated lithium and the threshold of precipitated lithium described above.

After obtaining the ratio of the amount of precipitated lithium of the battery pack to the threshold of precipitated lithium, the battery management module determines magnitude of the first current based on the ratio. In some embodiments of the present application, the larger a value of the ratio, the smaller a value of the first current.

For example, Table 1 shows a relationship between the first current and the ratio of the amount of precipitated lithium of the battery pack to the threshold of precipitated lithium according to some embodiments.

lithium is in the range of 85%-95%, the charging current is 1.15 C. In other words, in Table 1, the larger the ratio of the amount of precipitated lithium of the battery pack to the threshold of precipitated lithium, the smaller the value of the first current.

In step S21, charging with different magnitudes of the first current can be implemented according to different specific lithium precipitation situations, which further significantly reduces the precipitated lithium ions. In addition, when the ratio of the amount of precipitated lithium of the battery pack to the threshold of precipitated lithium is larger, and the duration of lithium precipitation is longer, a smaller charging current, that is, the first current, can further reduce lithium precipitation.

Similar to steps S11 and S12 in FIG. 1, in FIG. 2, the battery management module sends a charging request for a first current to a charging pile in step S22, and controls the battery pack to be charged with the first current in step S23.

In step S24, the battery management module determines whether the battery pack is continuously charged with the first current for a predetermined duration or determines whether a state of charge (SOC) of the battery pack reaches a predetermined value.

As described above, the charging method of the present application is mainly applicable to the stepwise charging method. The condition for the determining in step S24 mainly depends on a preset condition for switching a current between the stages during the stepwise charging.

For example, when it is set in the stepwise charging method that the battery pack is switched from being continuously charged with a current charging current for five minutes to being charged with a next charging current (for example, referring to Table 1, switched from being continuously charged for five minutes in the first stage to being charged in the second stage), in step S24 of the present application, the battery management module determines whether the battery pack is continuously charged with the first current for a predetermined duration.

For another example, when it is set in the stepwise charging method that the battery pack is switched from being charged with a current charging current such that a state of charge (SOC) of the battery pack reaches 50% to

TABLE 1

| Ratio of an amount of precipitated lithium in the battery pack to a threshold of precipitated lithium | Stages of step-wise charging | | | | | | | | |
| --- | --- | --- | --- | --- | --- | --- | --- | --- | --- |
| | First stage | Second stage | Third stage | Fourth stage | Fifth stage | Sixth stage | Seventh stage | Eighth stage | Ninth stage |
| 0%-50% | 1.40 C | 1.25 C | 1.10 C | 1.00 C | 0.87 C | 0.67 C | 0.50 C | 0.20 C | 0.10 C |
| 50%-85% | 1.35 C | 1.20 C | 1.08 C | 0.90 C | 0.80 C | 0.60 C | 0.40 C | 0.15 C | 0.08 C |
| 85%-95% | 1.30 C | 1.15 C | 1.00 C | 0.87 C | 0.70 C | 0.50 C | 0.30 C | 0.10 C | 0.05 C |

As shown in Table 1, for example, in the second stage of stepwise charging, when the ratio of the amount of precipitated lithium of the battery pack to the threshold of precipitated lithium is in the range of 0%-50%, a charging current (that is, the first current) is 1.25 C (1 C is the magnitude of the current used for fully charging the battery pack in one hour), and when the ratio of the amount of precipitated lithium of the battery pack to the threshold of precipitated lithium is in the range of 50%-85%, the charging current is 1.20 C, and when the ratio of the amount of precipitated lithium of the battery pack to the threshold of precipitated being charged with a next charging current (for example, referring to Table 1, it is set that the battery pack is switched from being charged such that the state of charge (SOC) of the battery pack reaches 50% in the third stage to being charged in the fourth stage), in step S24 of the present application, the battery management module determines whether the state of charge (SOC) of the battery pack reaches a predetermined value.

In step S24, the battery management module determines whether it is time to perform pulse discharge (or add a negative pulse). At a moment when switching the current is required, pulse discharge is performed in a timely manner, which can effectively promote the tip of precipitated lithium metal to re-enter an electrolyte, flatten lithium dendrites, and inhibit the continuous accumulation of lithium dendrites, and significantly improve the charging safety of the battery.

If the battery management module determines that a duration for continuously charging the battery pack with the first current does not reach the predetermined duration or that the state of charge (SOC) of the battery pack does not reach the predetermined value, step S23 is performed to continue to control the battery pack to be charged with the first current.

If the battery management module determines that the duration for continuously charging the battery pack with the first current reaches the predetermined duration or that the state of charge (SOC) of the battery pack reaches the predetermined value, step S25 is performed, that is, the battery management module sends a charging request for a current of 0 A to the charging pile, and pulse discharge starts to be performed. While sending the charging request for the current of 0 A to the charging pile, the battery management module may optionally measure a request duration of the charging request for the current of 0 A, so as to prevent accidental unplugging of a charging gun from the charging pile due to an excessively long request duration of the charging request for the current of 0 A.

While step S25 is performed, the battery management module obtains a real-time charging current in step S26. Because the current being used by the charging pile to charge the battery pack may not immediately drop to 0 A after the battery management module sends the charging request for the current of 0 A to the charging pile, the battery management module needs to obtain the real-time charging current, that is, the current being used by the charging pile to charge the battery pack.

In step S27, the battery management module determines whether the real-time charging current is less than a threshold of the first current. In some embodiments of the present application, the threshold of the first current may range optionally, for example, from 0.1 A to 10 A.

If the battery management module determines that the real-time charging current is greater than or equal to the threshold of the first current, step S26 is performed, that is, the battery management module still obtains the real-time charging current.

If the battery management module determines that the real-time charging current is less than the threshold of the first current, step S28 is performed, that is, the battery management module controls the battery pack to discharge with a discharging current, and obtains a discharging duration for which the battery pack discharges with the discharging current. Discharging is performed when the real-time charging current is less than the threshold of the first current but not completely equal to zero, so that the charging process will not be interrupted. In some embodiments of the present application, the discharging current may range from 1 A to 5 C (1 C is the magnitude of the current used for fully charging the battery pack in one hour), or optionally range from 1 C to 3 C.

In some embodiments of the present application, the magnitude of the discharging current also varies depending on the ratio of the amount of precipitated lithium of the battery pack to the threshold of precipitated lithium. Specifically, the greater the ratio of the amount of precipitated lithium of the battery pack to the threshold of precipitated lithium, the greater the discharging current. This is because a larger ratio of the amount of precipitated lithium of the battery pack to the threshold of precipitated lithium indicates that lithium precipitation in the battery pack is more severe, and a larger discharging current is required to promote the tip of more precipitated lithium metal to re-enter the electrolyte, flatten lithium dendrites, and further reduce lithium precipitation.

In some embodiments of the present application, the battery pack may discharge to the charging pile. In some embodiments of the present application, the battery pack may be located in a power consuming apparatus (for example, including, but not limited to, a mobile phone, a tablet, a notebook computer, an electric toy, an electric tool, an electromobile, an electric vehicle, a ship, and a spacecraft). In this case, the battery pack may discharge to the power consuming apparatus.

In step S29, the battery management module determines whether the discharging duration reaches the first duration threshold, so as to prevent over discharge. In some embodiments of the present application, the first duration threshold may range from 1 s to 60 s.

Or, optionally, if the battery management module has measured the request duration of the charging request for the current of 0 A in step S25, whether the request duration reaches a second duration threshold is determined in step S29, so as to prevent accidental unplugging of a charging gun from the charging pile due to an excessively long request duration of the charging request for the current of 0 A, as described above. In some embodiments of the present application, the first duration threshold may range from 2 s to 120 s.

If the battery management module determines that the discharging duration does not reach the first duration threshold or that the request duration does not reach the second duration threshold, step S28 is performed, that is, the battery management module continues to control the battery pack to discharge with a discharging current, and obtain a discharging duration for which the battery pack discharges with the discharging current.

If the battery management module determines that the discharging duration reaches the first duration threshold or that the request duration reaches the second duration threshold, step S30 is performed, that is, the battery pack is controlled to stop discharging, and a charging request for a second current is sent to the charging pile for charging.

As mentioned above, the charging method of the present application is mainly applicable to the stepwise charging method, and in the stepwise charging method, the current in the second stage is less than the current in the first stage, so that the second current in step S30 is less than the first current.

In addition, according to some embodiments of the present application, when the battery management module determines that the battery pack is in a fully charged state or in a state that it stops being charged after gun unplugging, the battery pack is controlled to discharge with another discharging current for a discharging duration. For example, the battery pack may be controlled to discharge with a discharging current of 0.1 A-10 A for 1 s-20 s. In some embodiments of the present application, the battery pack may discharge to the charging pile or the power consuming apparatus described above.

Controlling the battery pack to discharge when the battery pack is in the fully charged state or in the state that it stops being charged after gun unplugging can further effectively promote the tip of precipitated lithium metal to re-enter the electrolyte, flatten lithium dendrites, and inhibit the continuous accumulation of lithium dendrites, and further improve the charging safety of the battery pack.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A charging method for a battery pack comprising a battery management module, the charging method comprising:
    sending, by the battery management module, a charging request for a first current to a charging pile for charging;
    controlling, by the battery management module in response to determining that first-current charging of the battery pack meets a first predetermined condition, the battery pack to perform pulse discharge;
    controlling, by the battery management module in response to determining that the pulse discharge of the battery pack meets a second predetermined condition, the battery pack to stop discharging, and sending a charging request for a second current to the charging pile for charging, wherein the second current is less than the first current;
    determining, by the battery management module, a ratio of an amount of precipitated lithium of the battery pack to a threshold of precipitated lithium, and determining, by the battery management module, magnitude of the first current based on the ratio;
    wherein the threshold of precipitated lithium is an amount of precipitated lithium that triggers an internal short circuit in the battery pack.

2. The charging method according to claim 1, wherein controlling, by the battery management module in response to determining that the first-current charging of the battery pack meets the first predetermined condition, the battery pack to perform the pulse discharge comprises:
    controlling, by the battery management module in response to determining that the battery pack is continuously charged with the first current for a predetermined duration, the battery pack to perform the pulse discharge.

3. The charging method according to claim 1, wherein the controlling, by the battery management module in response to determining that first-current charging of the battery pack meets the first predetermined condition, the battery pack to perform the pulse discharge comprises:
    controlling, by the battery management module in response to determining that a state of charge (SOC) of the battery pack reaches a predetermined value, the battery pack to perform pulse discharge.

4. The charging method according to claim 1, wherein controlling, by the battery management module in response to determining that the first-current charging of the battery pack meets the first predetermined condition, the battery pack to perform the pulse discharge comprises:
    sending, by the battery management module in response to determining that the first-current charging of the battery pack meets the first predetermined condition, a charging request for a current of 0 A to the charging pile, and obtaining a real-time charging current, wherein the real-time charging current is a current used by the charging pile to charge the battery pack; and
    controlling, by the battery management module in response to determining that the real-time charging current is less than a threshold of the first current, controlling the battery pack to discharge with a discharging current, and obtaining, by the battery management module, a discharging duration for which the battery pack discharges with the discharging current.

5. The charging method according to claim 1, wherein controlling, by the battery management module in response to determining that the first-current charging of the battery pack meets the first predetermined condition, the battery pack to perform the pulse discharge comprises:
    sending, by the battery management module in response to determining that the first-current charging of the battery pack meets the first predetermined condition, a charging request for a current of 0 A to the charging pile, obtaining a real-time charging current, and obtaining a request duration of the charging request for the current of 0 A, wherein the real-time charging current is a current used by the charging pile to charge the battery pack; and
    controlling, by the battery management module in response to determining that the real-time charging current is less than a threshold of the first current, the battery pack to discharge with a discharging current, and obtaining, by the battery management module, a discharging duration for which the battery pack discharges with the discharging current.

6. The charging method according to claim 5, wherein controlling, by the battery management module in response to determining that the pulse discharge of the battery pack meets the second predetermined condition, the battery pack to stop discharging comprises:
    controlling, by the battery management module in response to determining that the discharging duration reaches a first duration threshold or the request duration reaches a second duration threshold, the battery pack to stop discharging.

7. The charging method according to claim 1, wherein controlling, by the battery management module in response to determining that the first-current charging of the battery pack meets the first predetermined condition, the battery pack to perform the pulse discharge comprises:
    controlling, by the battery management module in response to determining that the first-current charging of the battery pack meets the first predetermined condition, the battery pack to perform the pulse discharge to the charging pile or a power consuming apparatus, wherein the battery pack is located in the power consuming apparatus.

8. A computer-readable storage medium storing computer instructions, wherein when the computer instructions are executed, the charging method according to claim 1 is performed.

9. A power consuming apparatus, comprising a battery pack, wherein the battery pack is configured to perform the charging method according to claim 1.

\* \* \* \* \*